(12) United States Patent
Arioka et al.

(10) Patent No.: US 10,267,689 B2
(45) Date of Patent: Apr. 23, 2019

(54) TEMPERATURE MEASURING SYSTEM AND TEMPERATURE MEASURING METHOD

(71) Applicant: FUJITSU LIMITED, Kawasaki-shi, Kanagawa (JP)

(72) Inventors: Takahiro Arioka, Isehara (JP); Kazushi Uno, Atsugi (JP); Takeo Kasajima, Machida (JP); Fumio Takei, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 598 days.

(21) Appl. No.: 14/989,000

(22) Filed: Jan. 6, 2016

(65) Prior Publication Data

US 2016/0238460 A1 Aug. 18, 2016

(30) Foreign Application Priority Data

Feb. 18, 2015 (JP) ................................ 2015-029598

(51) Int. Cl.
*G01K 11/32* (2006.01)

(52) U.S. Cl.
CPC .................................... *G01K 11/32* (2013.01)

(58) Field of Classification Search
CPC .................................................... G01K 11/32
See application file for complete search history.

(56) References Cited

U.S. PATENT DOCUMENTS

| 5,825,804 A * | 10/1998 | Sai | G01K 11/32 374/137 |
| 2012/0033709 A1* | 2/2012 | Kasajima | G01K 11/32 374/161 |
| 2012/0307861 A1* | 12/2012 | Takei | G01K 3/06 374/102 |
| 2013/0100984 A1* | 4/2013 | Agawa | G01K 11/32 374/161 |

FOREIGN PATENT DOCUMENTS

| JP | 02-201133 | 8/1990 |
| JP | 07-243920 | 9/1995 |

* cited by examiner

*Primary Examiner* — Natalie Huls
*Assistant Examiner* — Janice M Soto
(74) *Attorney, Agent, or Firm* — Fujitsu Patent Center

(57) ABSTRACT

A temperature measuring system includes a laser light source that emits optical pulses, an optical fiber, arranged to pass through a plurality of temperature measuring points, and input with the optical pulses, and a measuring device that detects back-scattering light output from the optical fiber and measures a temperature at the plurality of measuring points, to acquire measured temperature data. The measuring device computes corrected temperature data by varying a degree of averaging of the measured temperature data in a time direction, according to whether a time-sequential difference temperature data have a spatial correlation or a time correlation within a range that uses a target position of the optical fiber as a reference.

20 Claims, 13 Drawing Sheets

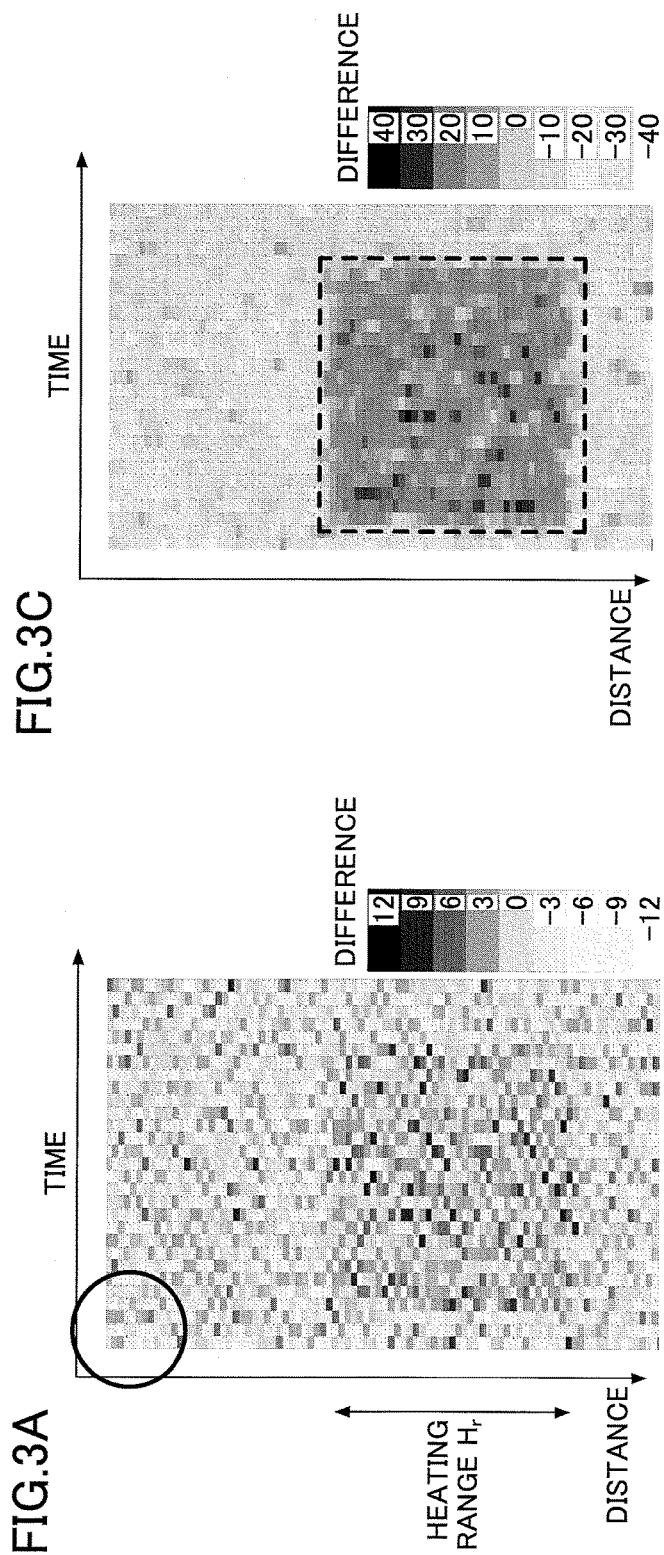
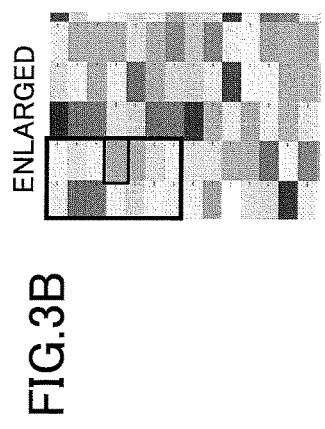
FIG.3A
FIG.3B
FIG.3C

TEMPERATURE MEASURING SYSTEM AND TEMPERATURE MEASURING METHOD

CROSS-REFERENCE TO RELATED APPLICATIONS

This application is based upon and claims the benefit of priority of the prior Japanese Patent Application No. 2015-029598, filed on Feb. 18, 2015, the entire contents of which are incorporated herein by reference.

FIELD

The embodiments discussed herein are related to a temperature measuring system, a temperature measuring method, and a computer-readable recording medium having stored therein a program for causing a computer to execute a temperature measuring process.

BACKGROUND

In a computer room, an IDC (Internet Data Center), or the like, an amount of heat generated from an electronic apparatus, such as a server, is increasing due to increasing integration density of the electronic apparatus. For this reason, it is desirable to appropriately cool the electronic apparatus.

Methods of cooling the electronic apparatus include a method that controls an indoor air flow to prevent excessive generation of heat accumulation, a method that cools the room by air conditioning, or the like, for example. In order to stably control the cooling state inside the room according to such cooling methods, it is desirable to measure the room temperature at a plurality of measuring points. When a three-dimensional temperature distribution inside the room can be obtained, this temperature distribution may be used to control the air conditioning or the like, so that it is possible to stably control the cooling state inside the room.

An example of the method that measures the temperature distribution includes a method that uses an optical fiber as a temperature sensor. Generally, in the case of the temperature measuring method that uses the optical fiber, measuring the temperature distribution with a high accuracy in a relatively narrow range, such as the server within the data center, is more difficult compared to measuring the temperature distribution with the high accuracy in a relatively wide range.

In a multipoint temperature measuring system using the optical fiber, optical pulses having a predetermined wavelength propagate through the optical fiber, and the temperature distribution along a propagating direction of the optical pulses is obtained from a variation with time of back-scattering light (that is, Raman scattering light) caused by the propagating optical pulses. In the temperature measuring method using the optical fiber, a distance resolution depends on an optical pulse width. In addition, an SNR (Signal-to-Noise Ratio) is determined based on a pulse area, and an elapsed time of temperature data at each measuring point for computing the temperature distribution from the variation with time of the back-scattering light. For this reason, in order to obtain a high distance resolution and a high SNR, a peak value of the optical pulses is desirably high. However, when optical pulses having a high laser power exceeding a threshold value (that is, a Raman threshold value) are input to the optical fiber that is a nonlinear medium, the so-called SRS (Stimulated Raman Scattering) occurs. Hence, the laser power is desirably suppressed to the threshold value or lower.

A laser light source is an example of a light source that emits the optical pulses. Generally, one of two kinds, namely, a solid state laser and a semiconductor laser, is used for the laser light source. The solid state laser is suited for high-precision measurement because of the wavelength accuracy and the peak value of the optical pulses are both high and noise is uneasily generated, however, the solid state laser is relatively expensive. On the other hand, the semiconductor laser is inexpensive compared to the solid state laser, however, the wavelength accuracy and the peak value of the optical pulses are both low and noise is easily generated. In addition, the SNR tends to deteriorate in the case of the semiconductor laser, because wavelength dispersion increases particularly at a far end. Accordingly, it is desirable to reduce the noise in the case in which the inexpensive semiconductor laser is used for the laser light source. There is a known method that improves the SNR by applying the Golay code, so as to use multipulses instead of a single pulse for the optical pulses. However, even when the multipulses are used for the optical pulses, there are cases in which the temperature accuracy required by big data analysis or the like, for example, cannot be satisfied.

In order to reduce the noise and further improve the SNR, it is conceivable to increase an accumulation time (or accumulation number) of the temperature data. The noise can be represented by a standard deviation in a predetermined temperature region, and is proportional to the accumulation time to the power $-\frac{1}{2}$. However, when the accumulation time of the temperature data at each of the measuring points increases, a time interval of the temperature measurement required until the temperature measured at each measuring point is determined becomes longer. Hence, in order to reduce the noise without varying the time interval of the temperature measurement, Japanese Laid-Open Patent Publication No. 2-201133, for example, proposes a method that distinguishes the temperature change and the noise, based on a magnitude of a difference between the temperature data at different times, to vary the accumulation number for every measuring point. However, in a case in which the magnitude of the noise is approximately the same as or greater than the magnitude of the temperature change, it is difficult to distinguish the temperature change and the noise. In addition, when the temperature change and the noise cannot be distinguished from each other, it is difficult to reduce the noise.

An example of related art may include Japanese Laid-Open Patent Publication No. 7-243920, for example.

According to the conventional temperature measurement using the optical fiber, it is difficult to reduce the noise, because it is difficult to distinguish the temperature change and the noise.

SUMMARY

Accordingly, it is an object in one aspect of the embodiments to provide a temperature measuring system, a temperature measuring method, and a computer-readable recording medium, which can reduce noise in a temperature measurement using an optical fiber.

According to one aspect of the embodiments, a temperature measuring system including a laser light source configured to emit optical pulses; an optical fiber, arranged to pass through a plurality of temperature measuring points, and input with the optical pulses; and a measuring device configured to detect back-scattering light output from the optical fiber and measure a temperature at the plurality of measuring points, to acquire measured temperature data, wherein the measuring device computes corrected temperature data by varying a degree of averaging of the measured temperature data in a time direction, according to whether a time-sequential difference temperature data have a spatial correlation or a time correlation within a range that uses a target position of the optical fiber as a reference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A, 3B, and 3C are diagrams for explaining an example of a two-dimensional correlation map of difference temperature data;

DESCRIPTION OF EMBODIMENTS

In a temperature measuring system, a temperature measuring method, and a computer-readable recording medium disclosed herein, optical pulses emitted from a laser light source are input to an optical fiber that is arranged to pass through a plurality of temperature measuring points. A measuring device detects back-scattering light output from the optical fiber and measures a temperature at the plurality of measuring points, to acquire measured temperature data. The measuring device computes corrected temperature data by varying a degree of averaging of the measured temperature data in a time direction, according to whether a time-sequential difference temperature data have a spatial correlation or a time correlation within a range that uses a target position of the optical fiber as a reference.

Preferred embodiments of the present invention will be described with reference to the accompanying drawings.

A description will now be given of the temperature measuring system, the temperature measuring method, and the computer-readable recording medium in each embodiment according to the present invention.

Figure 1:
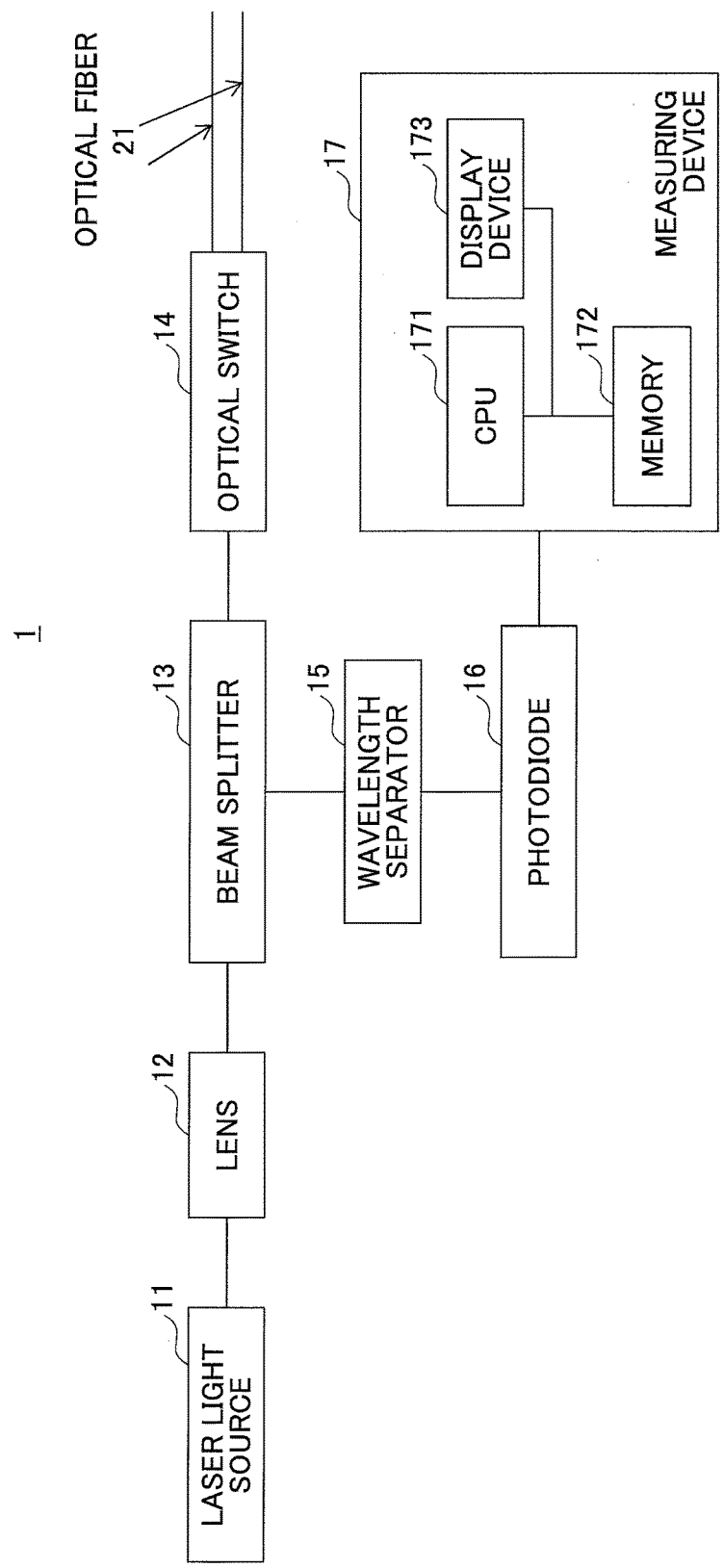
FIG. 1 is a block diagram illustrating an example of a temperature measuring system in one embodiment.

FIG. 1 is a block diagram illustrating an example of a temperature measuring system in one embodiment. A temperature measuring system 1 illustrated in FIG. 1 includes a laser light source 11, a lens 12, a beam splitter 13, an optical switch 14, a wavelength separator 15, a photodiode 16, and a measuring device 17. The optical switch 14 is connected to an optical fiber 21. The optical fiber 21 is arranged to pass through a plurality of measuring points (that is, a plurality of locations where the temperature is to be measured) of a measuring target, such as a server or the like within a data center. The optical fiber 21 forms a loop shape, and both ends of the loop shape connect to the optical switch 14. The measuring target is of course not limited to the server or the like within the data center. In FIG. 1, a route between the photodiode 16 and the measuring device 17 is an electrical route (or path), however, other routes are optical routes (or paths).

The laser light source 11 may be formed by a solid state laser, a semiconductor laser, or the like, for example. Optical pulses emitted from the laser light source 11 are supplied to the optical switch 14, that is an example of a switching device (or switching means), via the lens 12 and the beam splitter 13. The beam splitter 13 is an example of a light separator (or light separating means). The optical switch 14 alternately switches both ends of the optical fiber 21 at predetermined intervals, for example, by a known method, in order to alternately repeat a first mode and a second mode. In the first mode, back-scattering light of the optical pulses emitted from one end of the optical fiber 21 is received at the other end of the optical fiber 21. In the second mode, the back-scattering light emitted from the other end of the optical fiber 21 is received at the one end of the optical fiber 21.

The back-scattering light received by the optical switch 14 is deflected by the beam splitter 13 towards the wavelength separator 15. The wavelength separator 15 separates, from the back-scattering light, a wavelength component, such as Raman scattering light, Brillouin scattering light, or the like, that is used for the measurement, according to a known method. The wavelength component that is separated from the back-scattering light by the wavelength separator 15 may be set according to the temperature to be detected. The wavelength separator 15 may be formed by a combination of a beam splitter, an optical filter, a condenser lens, or the like. The photodiode 16 is an example of a photodetector. The photodiode 16 detects the wavelength component used for the measurement, separated by the wavelength separator 15, and outputs the detected wavelength component to the measuring device 17. The wavelength component used for the measurement may include the Raman scattering light, the Brillouin scattering light, Rayleigh scattering light, or the like.

The pulse width of the back-scattering light input to the photodiode 16 depends on a length of the optical fiber 21. Hence, an interval of the optical pulses emitted from the laser light source 11 is set so that an overlap of the back-scattering light of each of the optical pulses does not occur.

The measuring device 17 includes a CPU (Central Processing Unit) 171, a memory 172, and a display device 173. The CPU 171 is an example of a processor. The memory 172 is an example of a storage (or storage means) that stores data, and programs to be executed by the CPU 171. The display device 173 is an example of an output device (or output means) that outputs a measured result or the like. The CPU 171 can execute the program stored in the memory 172, and perform a temperature measuring process to compute the temperature at a plurality of measuring points, based on the detected wavelength component from the photodiode 16. The memory 172 may be formed by a non-transitory computer-readable recording medium having stored therein the program for causing a computer, such as the CPU 171, to execute the temperature measuring process. The non-transitory computer-readable recording medium may include a semiconductor memory device, various kinds of recording media, or the like. Measured temperature data output from the CPU 171 are displayed on the display device 173, for example. The measured temperature data displayed on the display device 173 may include a temperature distribution of the measuring target, the temperature at each of the measuring points, a warning according to the temperature, or the like.

In the measuring device 17, it is desirable to distinguish between a temperature change and noise, even in a case in which a magnitude of the noise is approximately the same as or greater than a magnitude of the temperature change. In other words, it is desirable to distinguish the temperature change from the noise, and vice versa. Hence, in the temperature measuring process in this embodiment, difference temperature data greater than or equal to a threshold value are collected within a predetermined range that uses a target position, which becomes the measuring point of the optical fiber 21, as a reference (or center). The temperature measuring process obtains corrected temperature data by varying a degree of averaging (that is, weighting) in a time direction of the measured temperature data, according to whether the time-sequential difference temperature data have a spatial correlation or a time correlation, to compute a corrected temperature distribution in which the temperature distribution is corrected. When correcting the temperature distribution, a parameter that is used to determine whether a change within the temperature distribution is the noise or the temperature change, may be a sum-set of the difference temperature data, an average value of the difference temperature data, a sum-set of signs of the difference temperature data, a degree of distortion of a variance of the difference temperature data (or difference set distortion), or the like. The parameter is not limited to a particular parameter, and may be any parameter that can reduce the effects of the noise by using set data.

Figure 2:
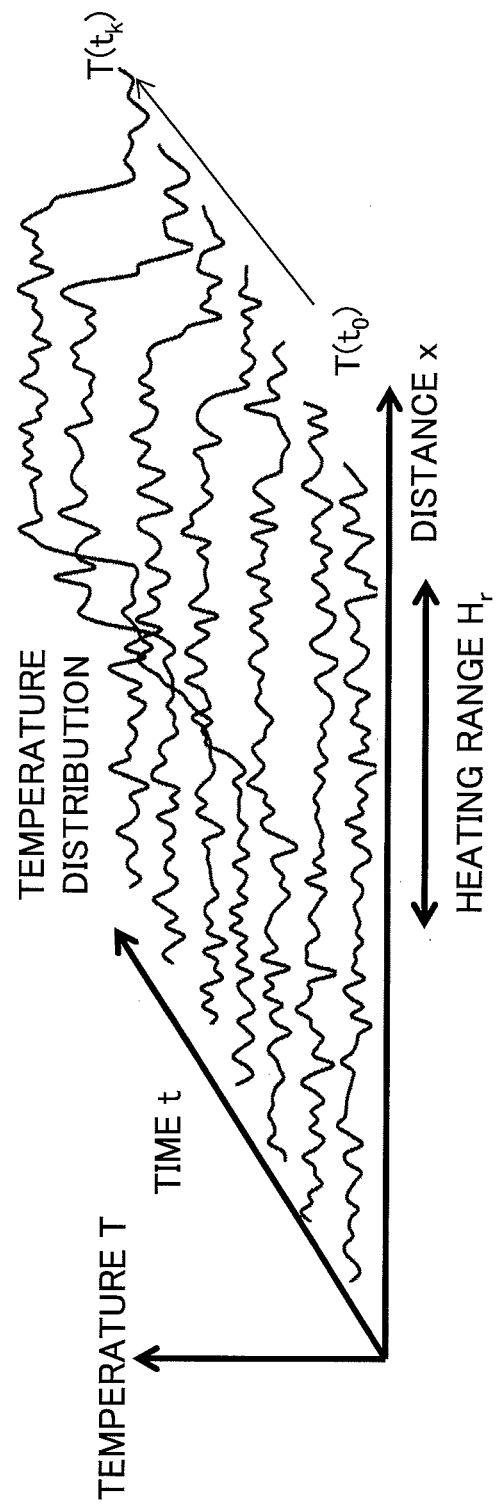
FIG. 2 is a diagram illustrating an example of a temperature distribution of a measuring target computed by a measuring device.

FIG. 2 is a diagram illustrating an example of a temperature distribution of the measuring target computed by the measuring device. In FIG. 2, the ordinate indicates a temperature T in arbitrary units, and the abscissa indicates a distance (or position) x, in arbitrary units, from one end (or another end) of the optical fiber 21 to which the optical pulses are input. Further, in FIG. 2, an axis along a depth direction indicates a time t in arbitrary units. In FIG. 2, Hr denotes a heating range.

FIGS. 3A, 3B, and 3C are diagrams for explaining an example of a two-dimensional correlation map of the difference temperature data. A region surrounded by a circle in FIG. 3A is illustrated on an enlarged scale in FIG. 3B, and a result obtained by collecting sets of difference temperature data within the predetermined range is illustrated in FIG. 3C. In FIGS. 3A and 3C, the ordinate indicates the distance in arbitrary units, and the abscissa indicates the time in arbitrary units. In FIG. 3A, the difference temperature data are illustrated in a range of −12 to 12 in arbitrary units. In FIG. 3C, the sum-set of the difference temperature data is illustrated in a range of −40 to 40 in arbitrary units.

First, a two-dimensional correlation table $\Delta T(t, x)$ of difference temperature data $\Delta T$ illustrated in FIG. 3A is created, based on the time-sequential difference temperature data $\Delta T = T(t_k) - T(t_{k-1})$. FIG. 3B illustrates, on an enlarged scale, the sets of the difference temperature data within the predetermined range using the target position as the reference, within the region of the two-dimensional correlation table $\Delta T(t, x)$, surrounded by the circle. FIG. 3C illustrates the result of obtaining a sum-set $\Sigma T(t, x)$ of the difference temperature data $\Delta T$ in the predetermined range described above, and it may be seen that, within a rectangular region surrounded by a dotted line, the sum-set $\Sigma T(t, x)$ of the difference temperature data $\Delta T$ is large compared to that within other regions. Accordingly, compared to a temperature change represented by the difference temperature data $\Delta T$ illustrated in FIG. 3A, it may be seen that a temperature change represented by a magnitude of the sum-set $\Sigma T(t, x)$ of the difference temperature data $\Delta T$ illustrated in FIG. 3C is clearer.

Hence, the target position of the optical fiber 21 is used as the reference (or center), and the two-dimensional spatial correlation of the difference temperature data corresponding to the difference of the measured temperature data within the predetermined range including sections on both sides of the target position is obtained. Alternatively, the two-dimensional time correlation of the difference temperature data corresponding to the difference of a current measured temperature data and a past measured temperature data measured within a predetermined time in the past before the current time, within the predetermined range. The noise and the temperature change are distinguished from each other using the two-dimensional spatial correlation or the two-dimensional time correlation. In other words, a judgment is made to determine whether the change within the temperature distribution is the noise or the temperature change, and the value of the temperature acquired at the target position of the optical fiber 21 is corrected according to a result of this judgment. The time correlation between a current position x and measured temperature data $y(x, t)$ can be represented by $A_t = y(x, t) - y(x, t-1)$ and $B_t = y(x, t-1) - y(x, t-2)$. On the other hand, the spatial correlation between the current position x and the measured temperature data $y(x, t)$ can be represented by $A_s = y(x, t) - y(x, t-1)$, $B_s = y(x-1, t) - y(x-1, t-1)$, and $C_s = y(x+1, t) - y(x+1, t-1)$.

Accordingly, in the case of the time correlation, when the difference temperature data $A_t$ and $B_t$ consecutively have the same sign (positive, for example), it may be judged that these difference temperature data $A_t$ and $B_t$ represent the temperature change. In other words, when a sign $\text{sign}(A_t)$ of the difference temperature data $A_t$ and a sign $\text{sign}(B_t)$ of the difference temperature data $B_t$ satisfy $\text{sign}(A_t) = \text{sign}(B_t)$, it may be judged that the measured temperature data $y(x, t)$ represents the temperature change, and thus, it is possible to use the measured temperature data $y(x, t)$ at the current time t, as it is, as the corrected temperature data, for example. In addition, it is possible to use data obtained by weighting the measured temperature data $y(x, t)$, as the corrected temperature data. Further, it is possible to use data obtained by weighting the measured temperature data at the current time t predicted from the measured temperature data $y(x, t-1)$ at the time t−1, and the measured temperature data $y(x, t)$, as the corrected temperature data. On the other hand, when the sign $\text{sign}(A_t)$ of the difference temperature data $A_t$ and the sign $\text{sign}(B_t)$ of the difference temperature data $B_t$ satisfy sign($A_t$)≠sign($B_t$), it may be judged that the measured temperature data y(x, t) represents the noise. In this case, it is possible to use data obtained by weighting the measured temperature data y(x, t−1) at the time t−1, as the corrected temperature data, for example.

In the case of the spatial correlation, when the difference temperature data $A_s$, $B_s$, and $C_s$ consecutively have the same sign (positive, for example), it may be judged that these difference temperature data $A_s$, $B_s$, and $C_s$ represent the temperature change. In other words, when a sign sign($A_s$) of the difference temperature data $A_s$, a sign sign($B_s$) of the difference temperature data $B_s$, and a sign sign($C_s$) of the difference temperature data $C_s$ satisfy sign($A_s$)=sign($B_s$)=sign($C_s$), it may be judged that the measured temperature data y(x, t) represents the temperature change, and thus, it is possible to use the measured temperature data y(x, t) at the current position x, as it is, as the corrected temperature data, for example. In addition, it is possible to use data obtained by weighting the measured temperature data y(x, t), as the corrected temperature data. Further, it is possible to use data obtained by weighting the measured temperature data at the current position x predicted from the measured temperature data y(x−1, t) at the position x−1, and the measured temperature data y(x, t), as the corrected temperature data. On the other hand, when the relationship sign($A_s$)=sign ($B_s$)=sign ($C_s$) is not satisfied, it may be judged that the measured temperature data y(x, t) represents the noise. In this case, it is possible to use data obtained by weighting the measured temperature data y(x−1, t) at the position x−1, as the corrected temperature data, or use data obtained by weighting the measured temperature data y(x, t−1) at the time t−1, as the corrected temperature data, for example.

As described above, it is possible to correct the measured temperature data by varying the degree of averaging (that is, weighing) the measured temperature data in the time direction according to whether the time-sequential difference temperature data has the spatial correlation or the time correlation. The temperature distribution can be computed based on the corrected temperature data that has been corrected as described above. In addition, the corrected temperature distribution may be computed by performing a process, such as a known weighted average (or weighted moving average) process on the corrected temperature data by taking into consideration the attenuation of light, for example.

Figure 4:
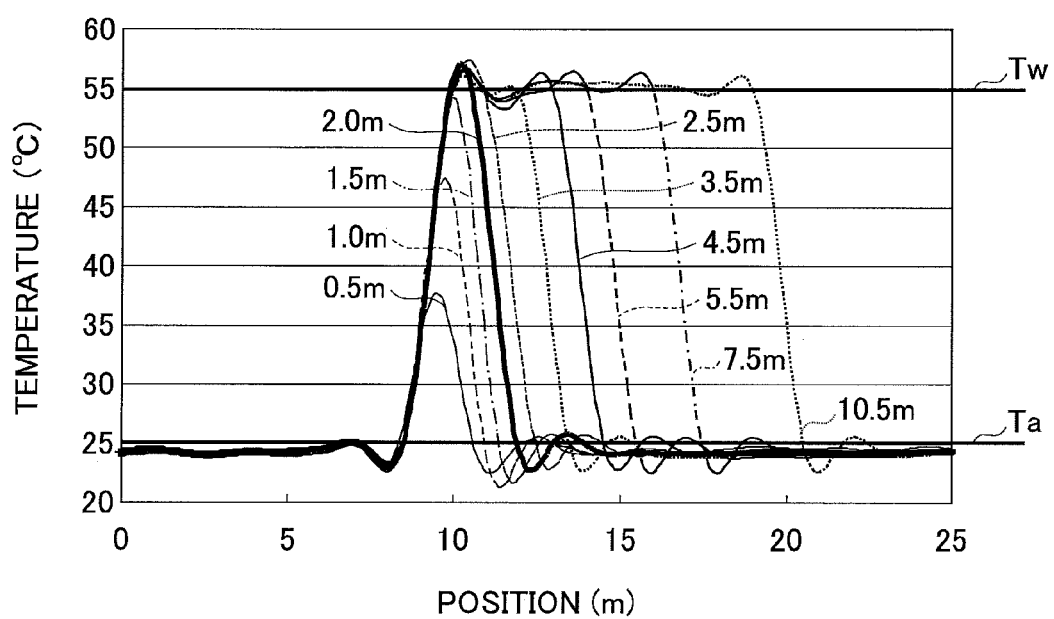
FIG. 4 is a diagram illustrating an example of a temperature characteristic with respect to positions of an optical fiber.
Figure 5:
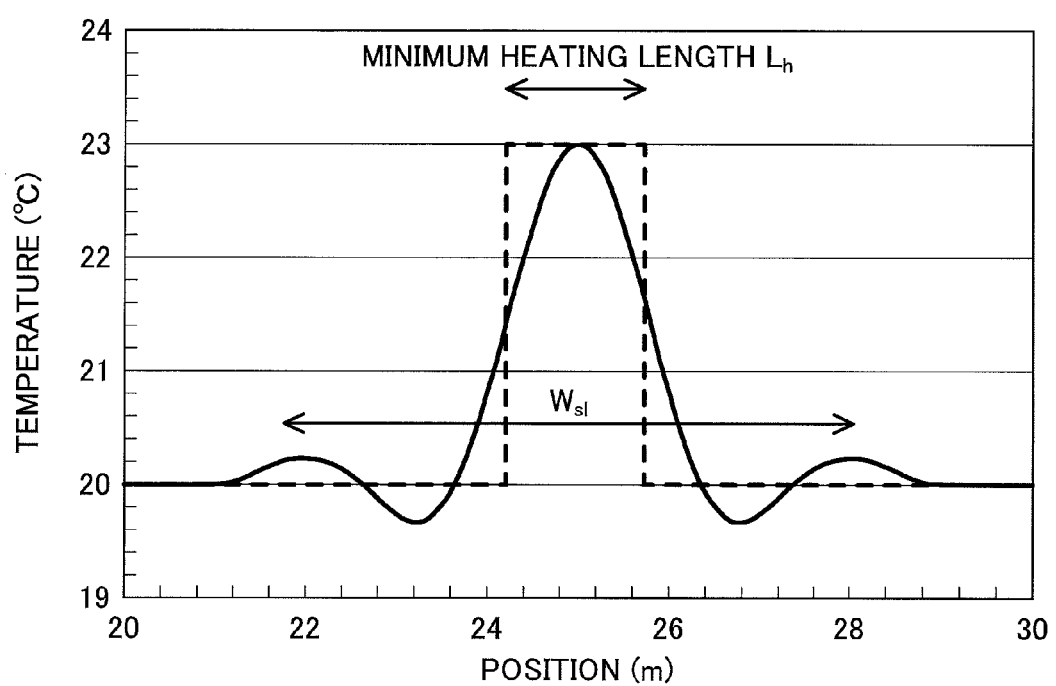
FIG. 5 is a diagram illustrating an example of a minimum heating length and a response.

In this embodiment, the predetermined range described above is a distance greater than or equal to a minimum heating length $L_h$ that is a response characteristic index of the optical fiber 21, for example. In addition, the predetermined range is a distance less than or equal to a side lobe of the measured temperature, corresponding to a response range at a time when the minimum heating length $L_h$ is heated. However, the predetermined range may be a distance less than the minimum heating length $L_h$. The minimum heating length $L_h$ refers to a minimum length of the optical fiber 21 that enables an accurate temperature measurement when heated, that is, a minimum length of the optical fiber 21 with which the peak temperature (or maximum value of the temperature) saturates. The minimum heating length $L_h$ can be determined based on the optical pulses input to the optical fiber 21, the transfer function of the optical fiber 21, a heat conductivity or a heat capacity of the optical fiber 21, a predicted heat quantity of a heat source included in the measuring target, or the like. FIG. 4 is a diagram illustrating an example of a temperature characteristic with respect to positions of the optical fiber, and FIG. 5 is a diagram illustrating an example of the minimum heating length and the response.

FIG. 4 illustrates an example of the measured temperature distribution that is actually measured by the measuring device 17 when a length of the optical fiber 21 dipped in hot water, that is an example of a liquid having a certain temperature, is varied from 0.5 m to 10.5 m. In FIG. 4, the ordinate indicates the temperature, and the abscissa indicates the position corresponding to the distance from one end (or the other end) of the optical fiber 21 to which the optical pulses are input, where $T_w$ denotes the temperature of the hot water, and $T_a$ denotes the temperature of air. In this example, up to a length of less than 2 m of the optical fiber 21 that is dipped in the hot water, the measured temperature is lower than the actual temperature. In the following description, the minimum length of the optical fiber 21 with which the peak temperature saturates, that is, the minimum heating length $L_h$, is 2 m in the example illustrated in FIG. 4. The response range when the minimum heating length $L_h$ with reference to the target position of the optical fiber 21 is heated, that is, a side lobe width $W_{s1}$ of the measured temperature illustrated in FIG. 5, is assumed to be a maximum possible range of the range having a high correlation to the target position. In FIG. 5, the ordinate indicates the temperature, and the abscissa indicates the position corresponding to the distance from one end (or the other end) of the optical fiber 21 to which the optical pulses are input, where a dotted line indicates the actual temperature, and a solid line indicates the measured temperature.

In order to suppress white noise in the difference temperature data, the range in which the difference temperature data are sampled is desirably as wide as possible. However, when the range in which the difference temperature data are sampled is too wide, it becomes impossible to detect a temperature variation peak having a narrow width. For this reason, the range in which the difference temperature data are sampled is desirably selected to less than or equal to the response range at the time when the minimum heating length $L_h$, that is the anticipated minimum temperature variation peak, is heated.

Figure 6:
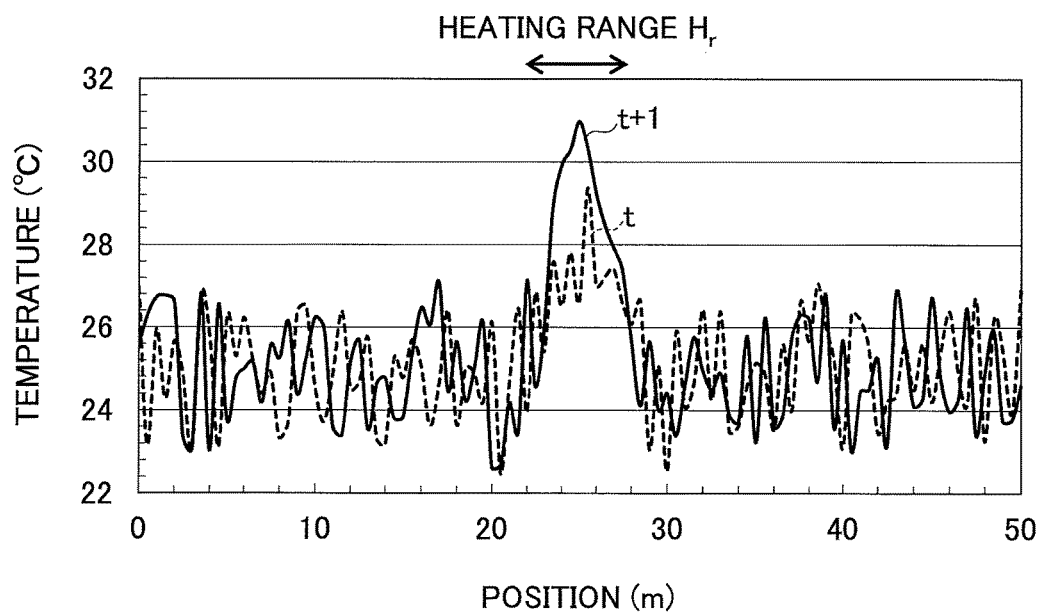
FIG. 6 is a diagram illustrating an example of a relationship between temperature and the position of the optical fiber.
Figure 7:
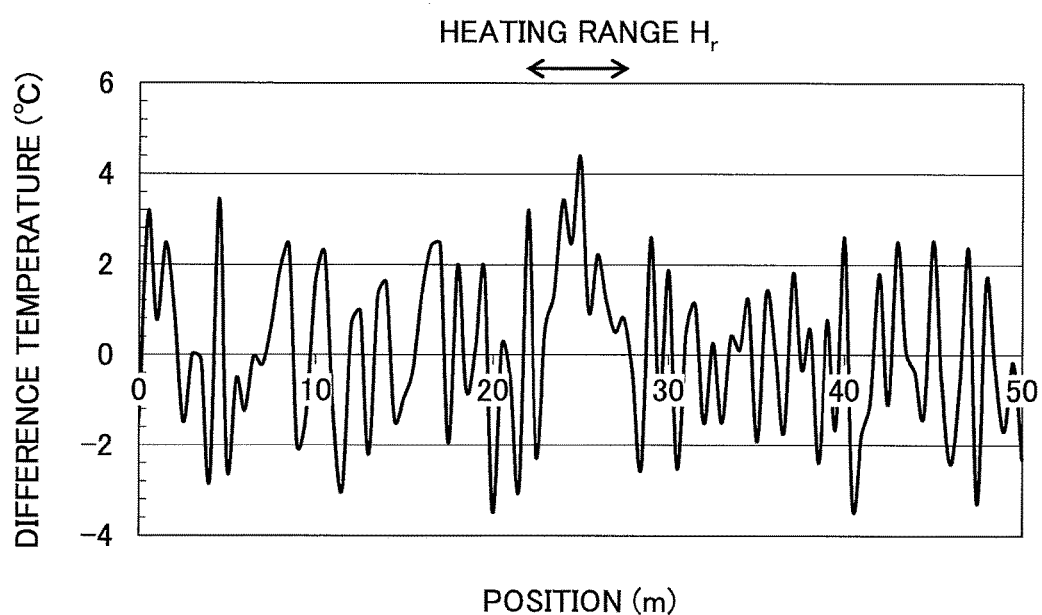
FIG. 7 is a diagram illustrating an example of a relationship between difference temperature data and the position of the optical fiber.
Figure 8:
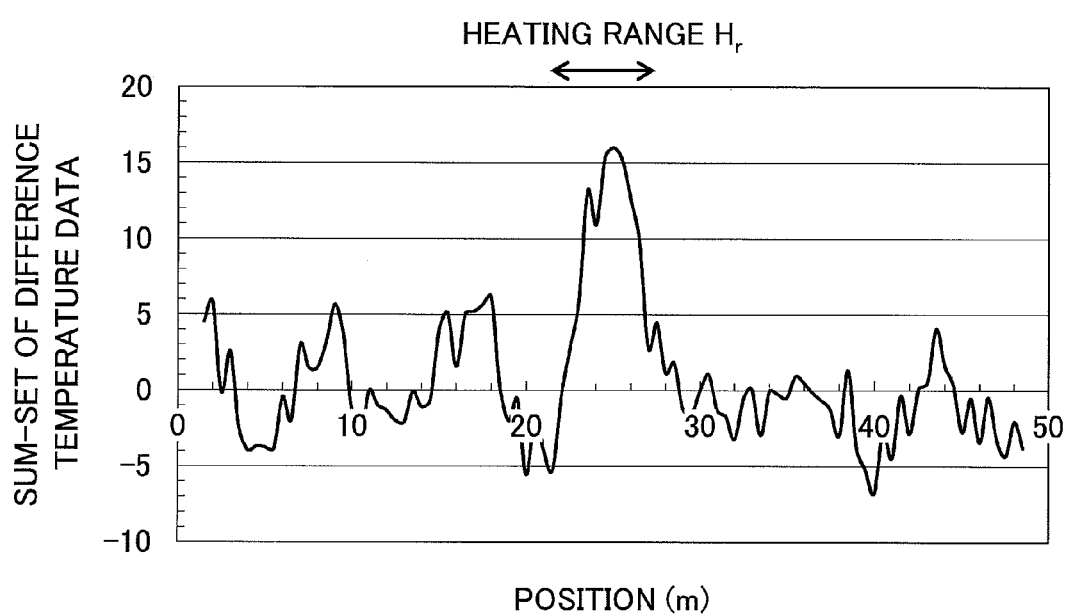
FIG. 8 is a diagram illustrating an example of a relationship between a sum-set of the difference temperature data and the position of the optical fiber.

A description will be given of particular examples of the difference temperature data, by referring to FIGS. 6 through 8. FIG. 6 is a diagram illustrating an example of a relationship between the temperature and the position of the optical fiber, and FIG. 7 is a diagram illustrating an example of a relationship between the difference temperature data and the position of the optical fiber. In addition, FIG. 8 is a diagram illustrating an example of a relationship between a sum-set of the difference temperature data and the position of the optical fiber.

FIG. 6 illustrates measured results of the temperature of the optical fiber at certain consecutive times t and t+1. In FIG. 6, the ordinate indicates the temperature, and the abscissa indicates the position corresponding to the distance from one end of the optical fiber 21 to which the optical pulses are input, where a dotted line indicates the temperature measured at the time t, and a solid line indicates the temperature measured at the time t+1. In this example, a heating range $H_r$ in a vicinity of the distance of 25 m from one end of the optical fiber 21 is heated, and the temperature rises in this heating range $H_r$. The difference temperature data at each of the positions from one end of the optical fiber 21, obtained from the results of the temperature measurement at the two consecutive times t and t+1, include a large amount of noise. For this reason, when the difference temperature data are obtained as illustrated in FIG. 7, it is difficult to distinguish the noise and the temperature change at a part corresponding to the vicinity of the heating range $H_r$. In FIG. 7, the ordinate indicates the difference temperature indicated by the difference temperature data, and the abscissa indicates the position corresponding to the distance from one end of the optical fiber 21 to which the optical pulses are input. However, this embodiment utilizes a sum-set that is an example of set data of the difference temperature data in the range of the minimum heating length $L_h$. Hence, it is possible to judge that the part corresponding to the vicinity of the heating range $H_r$ in FIG. 8 is a temperature change and not noise, and distinguish the temperature change from the noise. In FIG. 8, the ordinate indicates a value of the sum-set of the difference temperature data in arbitrary units, and the abscissa indicates the position corresponding to the distance from one end of the optical fiber 21 to which the optical pulses are input.

The parameter used to distinguish the noise and the temperature change from each other is not limited to the sum-set of the difference temperature data. As will be described later, the parameter may be an average value of the difference temperature data, a sum-set of signs of the difference temperature data, a degree of distortion of the variance of the difference temperature data (or difference set distortion), or the like, as long as the parameter reduces the effects of the noise by using the set data.

Figure 9:
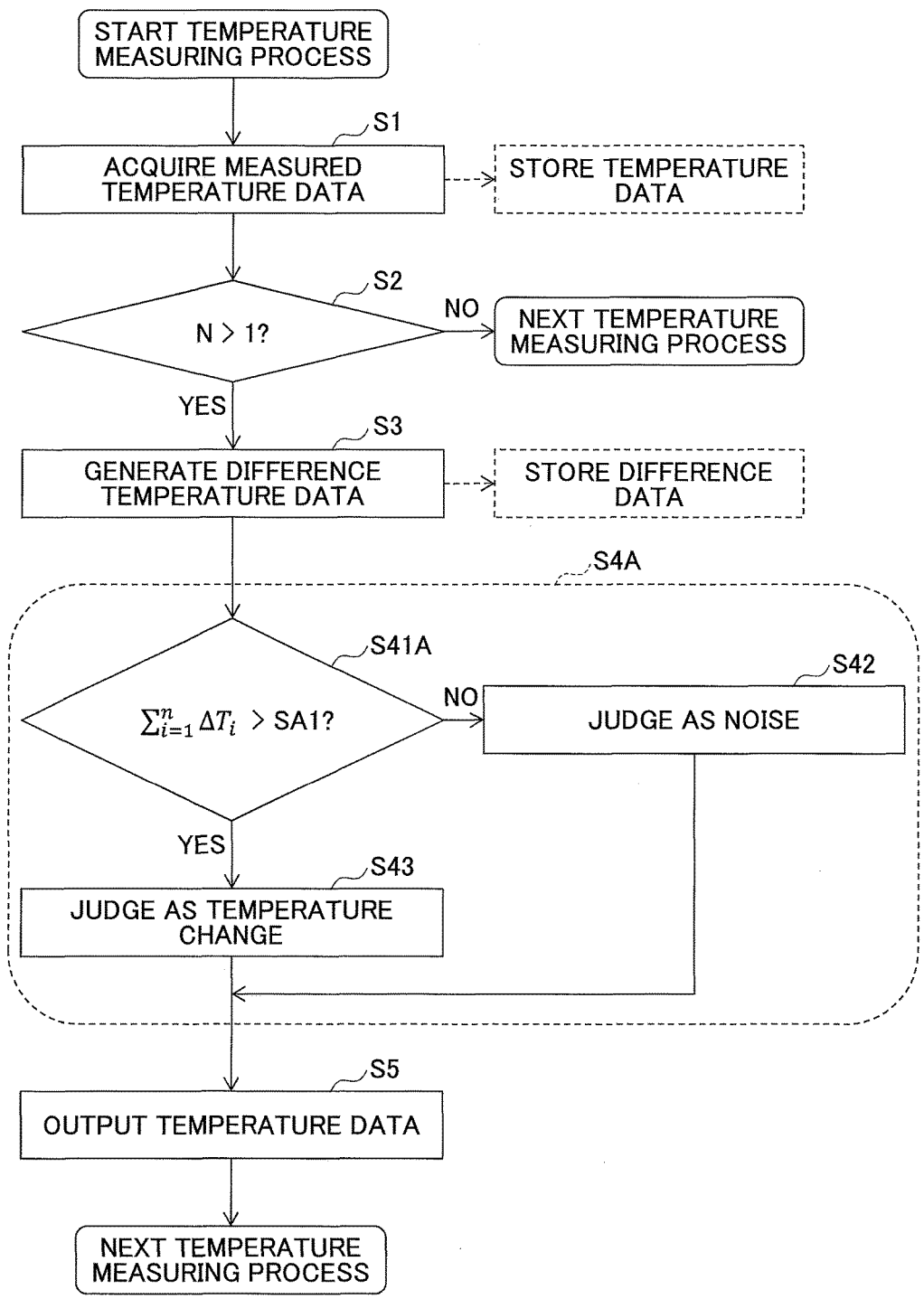
FIG. 9 is a flow chart for explaining a first example of a temperature measuring process in one embodiment.

FIG. 9 is a flow chart for explaining a first example of a temperature measuring process in one embodiment. The temperature measuring process illustrated in FIG. 9 can be executed by the CPU 171 of the measuring device 17 illustrated in FIG. 1. When the temperature measuring process using the optical fiber 21, illustrated in FIG. 9, starts, the CPU 171, in step S1, acquires the temperature data (that is, measured temperature data) $T_i$ measured within the predetermined range greater than or equal to the minimum heating length $L_h$ and less than or equal to the side lobe width $W_{s1}$, with reference to the target position (or measuring point), based on the detected wavelength component from the photodiode 16, and stores the measured temperature data $T_i$ in the memory 172. In step S2, the CPU 171 judges whether a measured number N, that is reset at the start of the temperature measuring process, is greater than 1. When the judgment result in step S2 is NO, N is incremented by 1 and the process advances to a next temperature measuring process using the optical fiber 21. On the other hand, when the judgment result in step S2 is YES, the CPU 171, in step S3, generates a difference temperature data $\Delta T_i = T_i - T_{i-1}$, that is a difference between a current measured temperature data $T_i$ and a previously measured temperature data $T_{i-1}$, and stores the difference temperature data $\Delta T_i$ in the memory 172. The difference temperature data $\Delta T_i$ corresponds to the difference of the time-sequential measured temperature data at spatially different positions within the predetermined range including the target position, or corresponds to the difference of the time-sequential measured temperature data at temporally different positions within the predetermined range. After step S3, the process advances to step S4A of a correction process.

The correction process of step S4A illustrated in FIG. 9 includes steps S41A, S42, and S43 described hereunder. In step S41A, the CPU 171 judges whether a sum-set $$\Sigma_{i=1}^{n} \Delta T_i$$

of the difference temperature data $\Delta T_i$ is greater than a threshold value SA1. When the judgment result in step S41A is NO, the CPU 171, in step S42, judges that the difference temperature data $\Delta T_i$ between the currently measured temperature data $T_i$ and the previously measured temperature data $T_{i-1}$ is noise, and computes data by weighting the previously measured temperature data $T_{i-1}$, for example, as the corrected temperature data. On the other hand, when the judgment result in step S41A is YES, the CPU 171, in step S43, judges that the difference temperature data $\Delta T_i$ between the currently measured temperature data $T_i$ and the previously measured temperature data $T_{i-1}$ is a temperature change, and computes the currently measured temperature data $T_i$, as it is (weighted by 1), as the corrected temperature data, for example. Alternatively, the CPU 171, in step S43, computes the data obtained by weighting (by other than 1) the currently measured temperature data $T_i$, as the corrected temperature data, for example. As a further alternative, the CPU 171, in step S43, may compute the data obtained by weighting the temperature data predicted from the previously acquired temperature data $T_{i-1}$ and the currently acquired temperature data $T_i$, as the corrected temperature data, for example. The weightings performed in step S43 and step S42 respectively are examples of a first weighting and a second weighting that is different from the first weighting. These weightings are not limited to particular weightings, however, the weighting performed in step S43 and the weighting performed in step S42 are mutually different.

After step S42 or step S43, the process advances to step S5. The CPU 171, in step S5, outputs the corrected temperature data computed in step S42 or step S43, and increments N by 1 before advancing to the next temperature measuring process using the optical fiber 21. Hence, the CPU 171 can compute the temperature distribution based on the corrected temperature data corrected in the above described manner. In addition, the CPU 171 may compute the corrected temperature distribution by performing a process, such as a known weighted average (or weighted moving average) process on the corrected temperature data by taking into consideration the attenuation of light, for example. The temperature measuring process illustrated in FIG. 9 may be ended according to an ending condition.

In a case in which the CPU 171, in step S43, judges that the currently measured temperature data $T_i$ is the temperature change, the position that is judged as the temperature change actually includes noise. Hence, a noise reduction process may be performed using predicted temperature data, for example.

Figure 10:
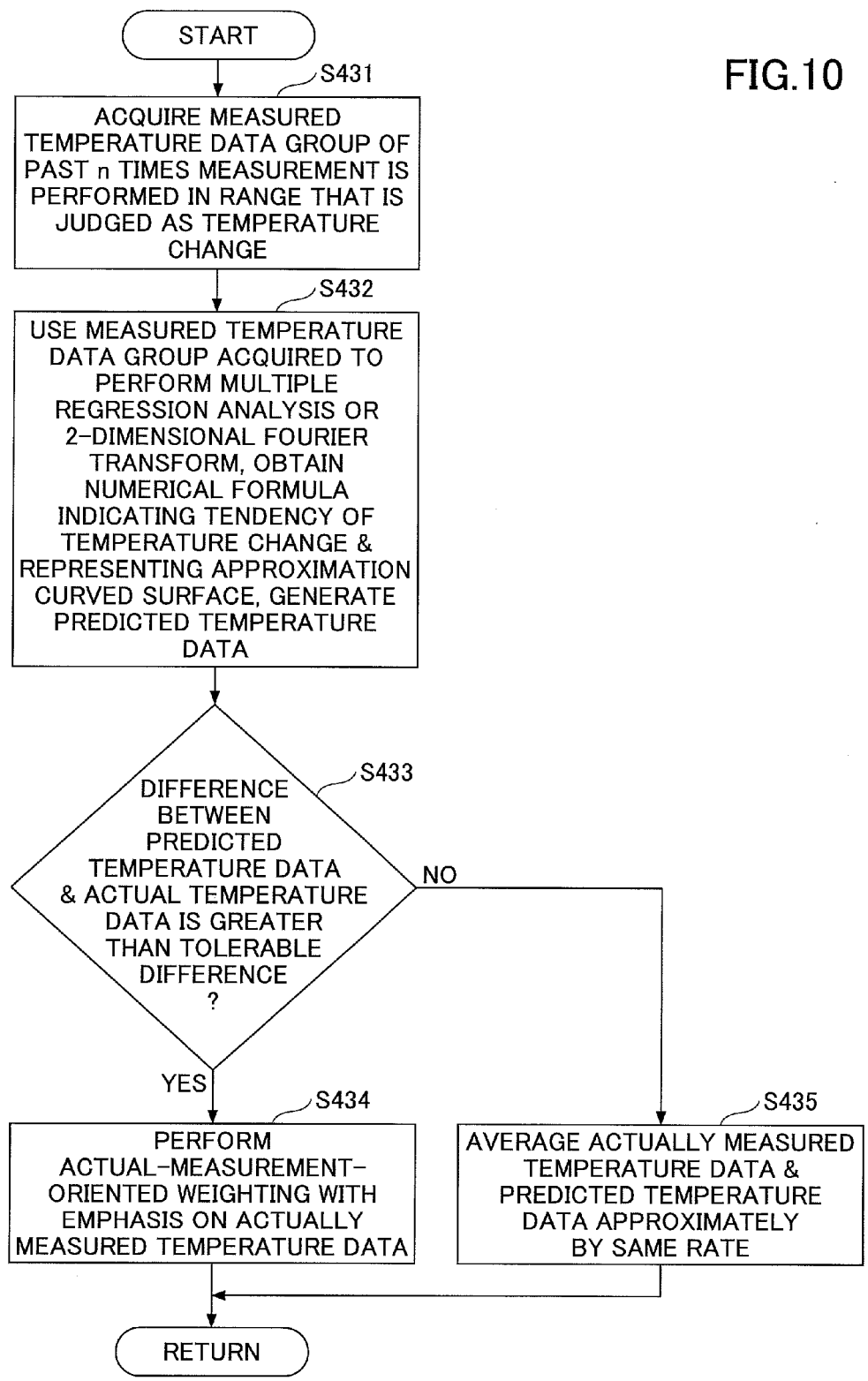
FIG. 10 is a flow chart for explaining an example of a noise reduction process.
Figure 11A:
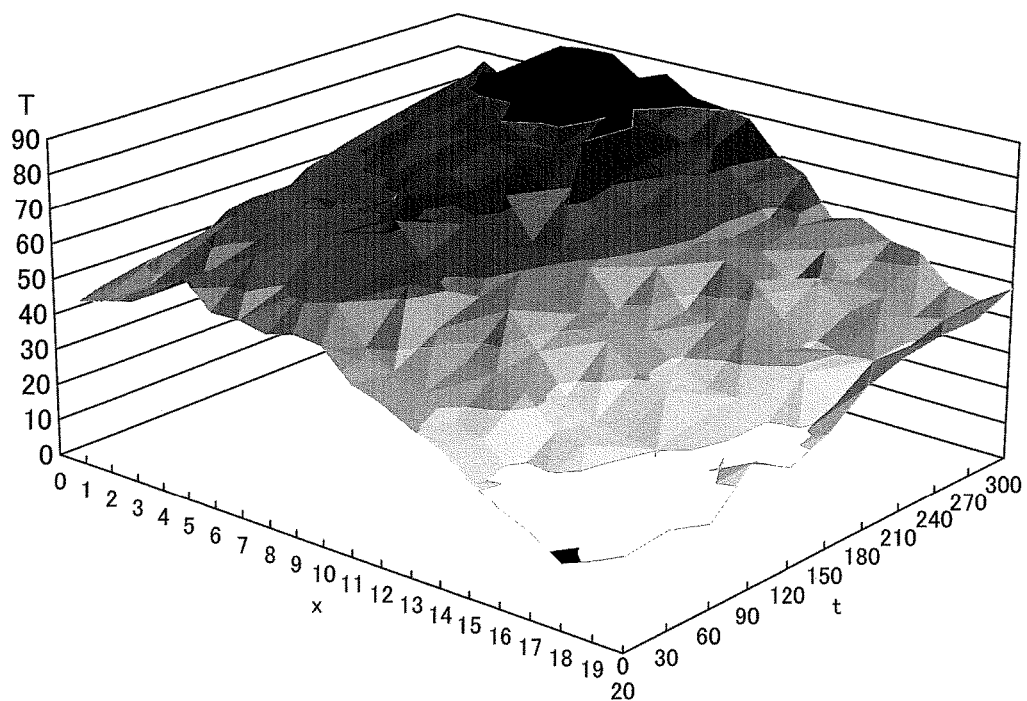
FIGS. 11A and 11B are diagrams for explaining an example of the noise reduction process.
Figure 11B:
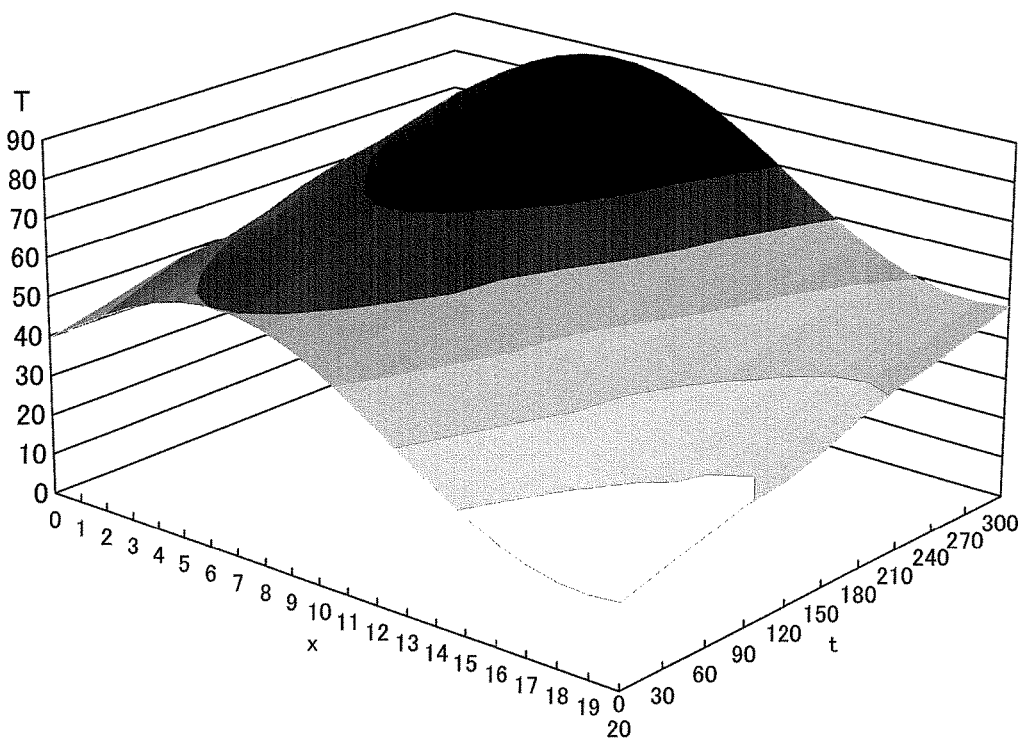

FIG. 10 is a flow chart for explaining an example of the noise reduction process at a time t=k. The noise reduction process illustrated in FIG. 10 is included in the process of step S43 illustrated in FIG. 9, and can be executed by the CPU 171 of the measuring device 17 illustrated in FIG. 1. In step S431 illustrated in FIG. 10, the CPU 171 acquires a measured temperature data group (position x, time t, and temperature T) of past n times the measurement is performed in the range that is judged as the temperature change. FIGS. 11A and 11B are diagrams for explaining an example of the noise reduction process. FIG. 11A illustrates an example of the measured temperature data group of the past n times the measurement is performed. In FIGS. 11A and 11B, data represented by halftone closer to black indicate data having a higher temperature. In step S432, the CPU 171 uses the measured temperature data group that is acquired to perform a multiple regression analysis or a two-dimensional Fourier transform, obtains a numerical formula indicating a tendency of the temperature change (that is, temperature increase or decrease) and representing an approximation curved surface (or approximation curve) illustrated in FIG. 11B, and generates predicted temperature data that is a prediction of the measured temperature data at a time t=k.

The CPU 171, in step S433, judges whether a difference between the predicted temperature data that is generated and the actually measured temperature data (that is, the measured temperature data) is large compared to a tolerable difference (for example, 1.5 times of a standard deviation 3σ, or the like). The process advances to step S434 when the judgment result in step S433 is YES, and the process advances to step S435 when the judgment result in step S433 is NO. In a case in which the difference between the predicted temperature data and the actually measured temperature data is greater than the tolerable difference, the CPU 171, in step S434, performs an actual-measurement-oriented weighting with emphasis on the actually measured temperature data, in which the degree of weighting of the actually measured temperature data is larger than the degree of weighting of the predicted temperature data. The process returns to step S43 illustrated in FIG. 9 after step S434. On the other hand, in a case in which the difference between the predicted temperature data and the actually measured temperature data is less than or equal to the tolerable difference, the CPU 171, in step S435, averages (that is, performs weighting of) the actually measured temperature data and the predicted temperature data approximately by the same rate, and the process returns to step S43 illustrated in FIG. 9. Accordingly, it is possible to reduce the noise included at the position that is judged as being the temperature change.

Figure 12:
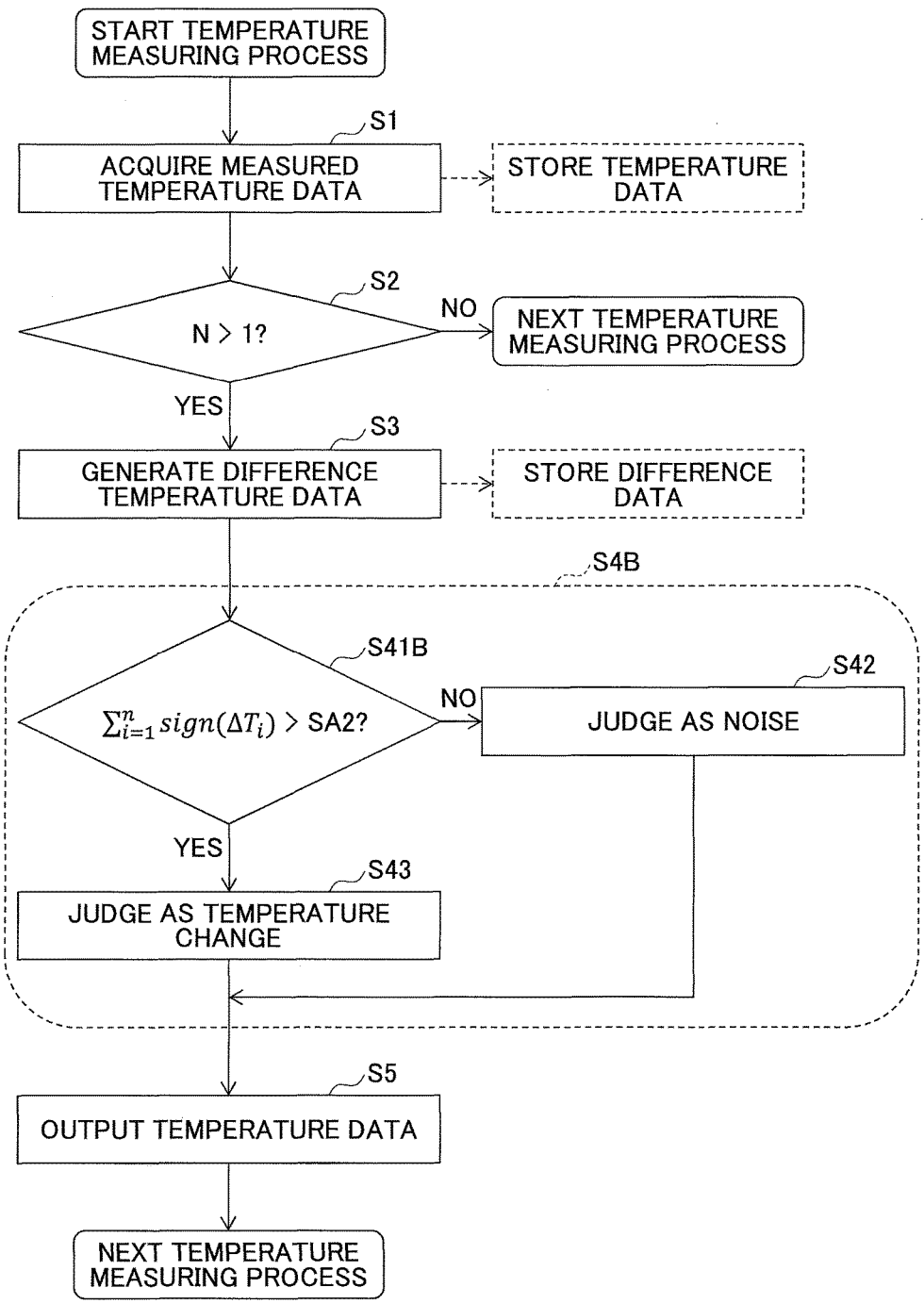
FIG. 12 is a flow chart for explaining a second example of the temperature measuring process in one embodiment.

FIG. 12 is a flow chart for explaining a second example of the temperature measuring process in one embodiment. The noise reduction process illustrated in FIG. 12 can be executed by the CPU 171 of the measuring device 17 illustrated in FIG. 1. In FIG. 12, those steps that are the same as those corresponding steps in FIG. 9 are designated by the same reference numerals, and a description thereof will be omitted.

Step S4B illustrated in FIG. 12 includes steps S41B, S42, and S43 described hereunder. The CPU 171, in step S41B, judges whether a sum-set $$\sum_{i=1}^{n} \text{sign}(\Delta T_i)$$

of signs of the difference temperature data $\Delta T_i$ is greater than a threshold value SA2. When the judgment result in step S41B is NO, the CPU 171, in step S42, judges that the currently measured temperature data $T_i$ is the noise, and computes the corrected temperature data in a manner similar to that described above in conjunction with FIG. 9. On the other hand, when the judgment result in step S41B is YES, the CPU 171, in step S43, judges that the currently measured temperature data $T_i$ is the temperature change, and computes the corrected temperature data in a manner similar to that described above in conjunction with FIG. 9.

Figure 13:
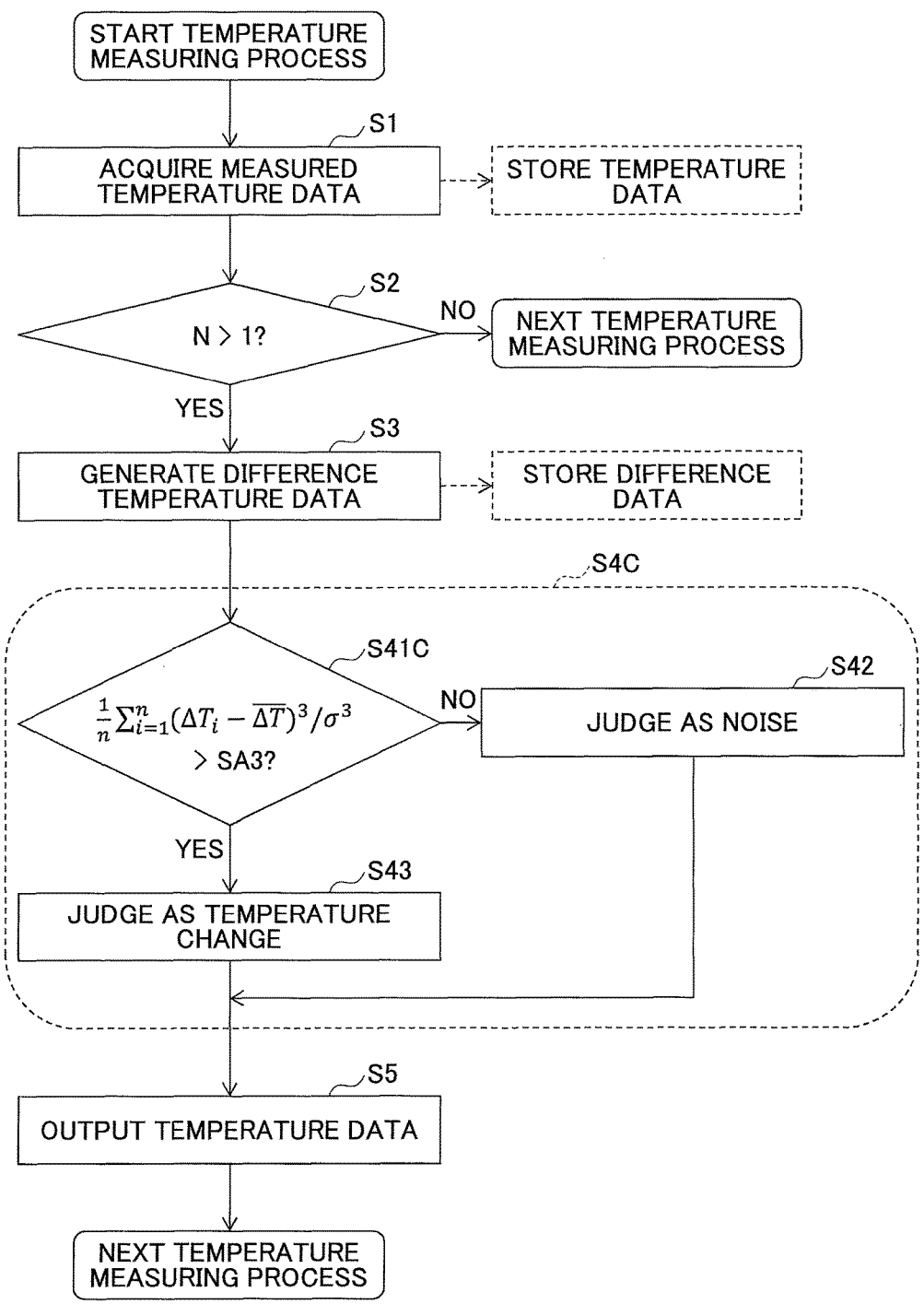
FIG. 13 is a flow chart for explaining a third example of the temperature measuring process in one embodiment.

FIG. 13 is a flow chart for explaining a third example of the temperature measuring process in one embodiment. The noise reduction process illustrated in FIG. 13 can be executed by the CPU 171 of the measuring device 17 illustrated in FIG. 1. In FIG. 13, those steps that are the same as those corresponding steps in FIG. 9 are designated by the same reference numerals, and a description thereof will be omitted.

Step S41C illustrated in FIG. 13 includes steps S41C, S42, and S43 described hereunder. The CPU 171, in step S41C, judges whether a set distortion $$\frac{1}{n} \sum_{i=1}^{n} (\Delta T_i - \overline{\Delta T})^3 / \sigma^3$$

of the difference temperature data $\Delta T_i$ is greater than a threshold value SA3, where $$\overline{\Delta T} = \frac{1}{n} \sum_{i=1}^{n} \Delta T_i$$

stands, and σ denotes a standard deviation of the difference temperature data $\Delta T_i$. When the judgment result in step S41C is NO, the CPU 171, in step S42, judges that the currently acquired temperature data $T_i$ is the noise, and computes the corrected temperature data in a manner similar to that described above in conjunction with FIG. 9. On the other hand, when the judgment result in step S41C is YES, the CPU 171, in step S43, judges that the currently acquired temperature data $T_i$ is the temperature change, and computes the corrected temperature data in a manner similar to that described above in conjunction with FIG. 9.

Figure 14:
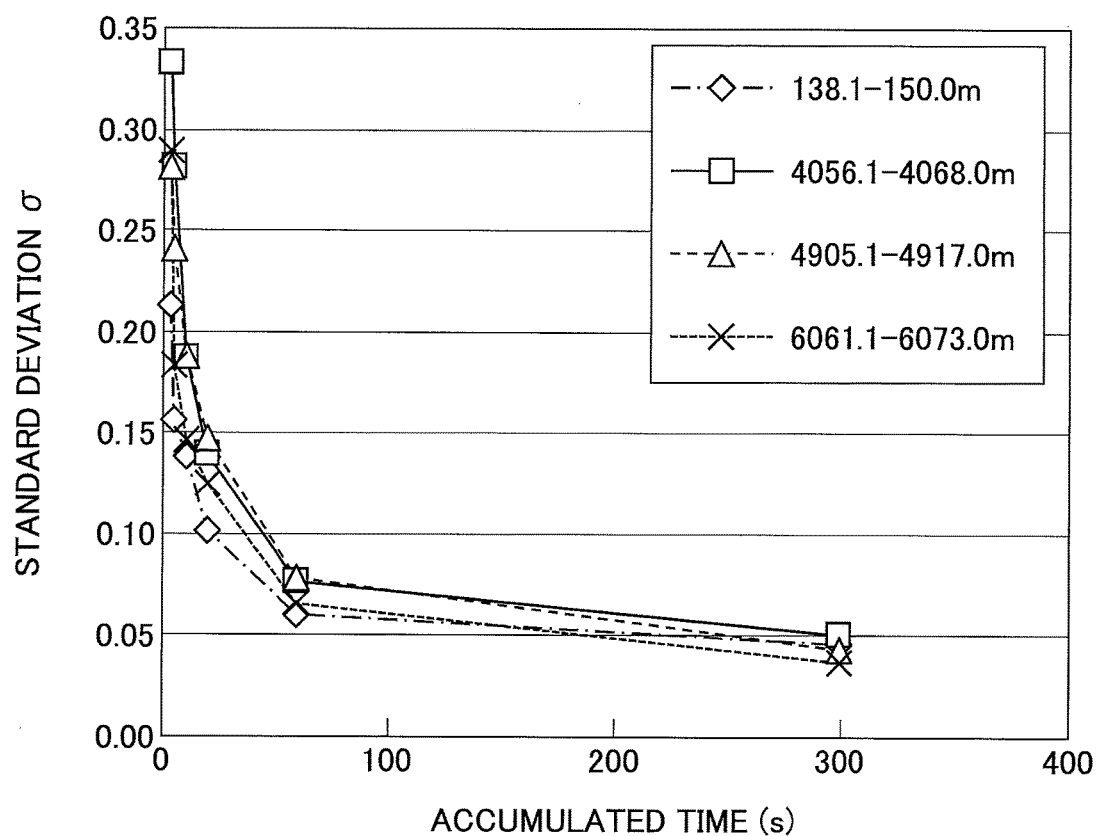
FIG. 14 is a diagram illustrating an example of a relationship between standard deviation and accumulation time.

FIG. 14 is a diagram illustrating an example of a relationship between the standard deviation and the accumulation time. In FIG. 14, the ordinate indicates the standard deviation σ of the difference temperature data, and the abscissa indicates the accumulation time in seconds (s). In FIG. 14, diamond marks "◇" indicate data at positions that are 138.1 m to 150.0 m from one end of the optical fiber 21 to which the optical pulses are input, rectangular marks "□" indicate data at positions that are 4056.1 m to 4068.0 m from one end of the optical fiber 21 to which the optical pulses are input, triangular marks "Δ" indicate data at positions that are 4905.1 m to 4917.0 m from one end of the optical fiber 21 to which the optical pulses are input, and cross marks "×" indicate data at positions that are 6061.1 m to 6073.0 m from one end of the optical fiber 21 to which the optical pulses are input. As may be seen from FIG. 14, the standard deviation σ (or noise) is proportional to the accumulation time to the power −½.

According to each of the examples described above, the temperature change and the noise are distinguished from each other within the predetermined range, by the processes of steps S41A, S41B, and S41C illustrated in FIGS. 9, 12, and 13, respectively. Hence, even in a case in which the magnitude of the noise is approximately the same as or greater than the magnitude of the temperature change, for example, it is possible to distinguish the temperature change and the noise from each other. In addition, because the temperature change and the noise can be distinguished from each other, in a case in which the semiconductor laser is used for the laser light source 11, for example, it is possible to reduce the noise even though the standard deviation σ has a tendency to increase when the accumulation time (or accumulation number) is reduced. On the other hand, in a case in which the solid state laser is used for the laser light source 11, for example, it is possible to further reduced the noise by distinguishing the temperature change and the noise from each other within the predetermined range described above, because the standard deviation σ is small and the amount of noise is originally small, and the accumulation time may be short (or accumulation number may be small).

According to each of the embodiments described above, it is possible to easily reduce the noise in the temperature measurement using the optical fiber, even in the case in which the magnitude of the noise is approximately the same as or greater than the magnitude of the temperature change, because the temperature change and the noise can be distinguished from each other. In addition, it is possible to reduce the measuring time required to measure the temperature distribution, and to improve the accuracy of the temperature measurement. Moreover, because it is possible to reduce the noise, it is possible to use, for the laser light source, the semiconductor laser that is less expensive than the solid state laser, for example, even though the temperature characteristic of the semiconductor laser is poorer compared to that of the solid state laser. As a result, it is possible to provide a temperature measuring system at a relatively low cost.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the examples are numbered with, for example, "first," "second," or "third," the ordinal numbers do not imply priorities of the examples. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A temperature measuring system comprising:
   a laser light source configured to emit optical pulses;
   an optical fiber having a first end and a second end opposite to the first end, and arranged to pass through a plurality of temperature measuring points between the first end and the second end;
   an optical switch configured to alternately switch between a first mode and a second mode at predetermined intervals, wherein the optical switch inputs the optical pulses from the laser light source to the first end of the optical fiber and outputs the optical pulses output from the second end of the optical fiber in the first mode, and inputs the optical pulses from the laser light source to the second end of the optical fiber and outputs the optical pulses output from the first end of the optical fiber in the second mode;
   a separator configured to separate a wavelength component from back-scattering light of the optical pulses output from the optical switch;
   a detector configured to detect the wavelength component separated by the separator; and
   a measuring device configured to perform a measuring process, and including
       a memory configured to store a program;
       a processor configured to execute the program; and
       a display device configured to display a result of the measuring process, wherein the processor performs the measuring process including
       measuring a temperature at the plurality of measuring points based on the wavelength component detected by the detector, to acquire measured temperature data,
       correcting the measured temperature data by varying a degree of averaging of the measured temperature data in a time direction, according to whether a time-sequential difference temperature data corresponding to a difference of the measured temperature data within a range, that uses a position of the optical fiber as a reference and includes sections on both sides of the position, have a spatial correlation within the range, or a time-sequential difference temperature data corresponding to a difference of a current measured temperature data and a past measured temperature data measured within a predetermined time before a current time, within the range, have a time correlation within the range, to compute corrected temperature data, and
       displaying the result of the measuring process, including the corrected temperature data, on the display device,
   wherein the range is greater than a minimum heating length indicating a minimum length of the optical fiber with which a peak temperature saturates, and is less than or equal to a side lobe width of the measured temperature data corresponding to a response range for a case in which the minimum heating length is heated.

2. The temperature measuring system as claimed in claim 1, wherein the varying the degree of averaging of the measured temperature data in the time direction, of the correcting, performs a first weighting by judging a temperature change in a case in which the time-sequential difference temperature data have the spatial correlation or the time correlation within the range, and performs a second weighting that is different from the first weighting by judging noise in a case in which the time-sequential difference temperature data have no spatial correlation or no time correlation within the range.

3. The temperature measuring system as claimed in claim 2, wherein
   the first weighting judges that the difference temperature data between a currently acquired measured temperature data and a previously acquired measured temperature data is the temperature change, and computes the corrected temperature data including one of the currently acquired measured temperature data, data obtained by weighting the currently acquired measured temperature data, and data obtained by weighting predicted temperature data predicted from the previously acquired measured temperature data and the currently acquired measured temperature data, and
   the second weighting judges that the difference temperature data between the currently acquired measured temperature data and the previously acquired measured temperature data is noise, and computes the corrected temperature data including data obtained by weighting the previously acquired measured temperature data.

4. The temperature measuring system as claimed in claim 2, wherein the processor performs the measuring process further including
   computing a temperature distribution within the range from the measured temperature data, using, as a parameter for distinguishing whether a change in the temperature distribution is the temperature change or the noise, set data selected from a group consisting of a sum-set of the difference temperature data, an average value of the difference temperature data, a sum-set of signs of the difference temperature data, and a distortion of a variance of the difference temperature data.

5. The temperature measuring system as claimed in claim 4, wherein the processor performs the measuring process further including
judging the change within the temperature distribution as being the temperature change when the parameter is greater than a threshold value; and
judging the change within the temperature distribution as being the noise when the parameter is less than or equal to the threshold value.

6. The temperature measuring system as claimed in claim 4, wherein the displaying the result of the measuring process further displays, on the display device, at least one of the temperature distribution, the temperature at each of the plurality of measuring points, and a warning according to the corrected temperature data, on the display device.

7. The temperature measuring system as claimed in claim 1, wherein the laser light source is one of a solid state laser and a semiconductor laser.

8. A temperature measuring method comprising:
inputting optical pulses emitted from a laser light source to an optical fiber that has a first end and a second end opposite to the first end and is arranged to pass through a plurality of temperature measuring points;
alternately switching an optical switch at predetermined intervals between a first mode in which the optical switch inputs the optical pulses from the laser light source to the first end of the optical fiber and outputs the optical pulses output from the second end of the optical fiber, and a second mode in which the optical switch inputs the optical pulses from the laser light source to the second end of the optical fiber and outputs the optical pulses output from the first end of the optical fiber;
separating, by a separator, a wavelength component from back-scattering light of the optical pulses output from the optical switch;
detecting, by a detector, the wavelength component separated by the separator; and
performing, by a processor, a measuring process including
measuring a temperature at the plurality of measuring points based on the wavelength component detected by the detecting, to acquire measured temperature data,
correcting the measured temperature data by varying a degree of averaging of the measured temperature data in a time direction, according to whether a time-sequential difference temperature data corresponding to a difference of the measured temperature data within a range, that uses a position of the optical fiber as a reference and includes sections on both sides of the position, have a spatial correlation within the range, or a time-sequential difference temperature data corresponding to a difference of a current measured temperature data and a past measured temperature data measured within a predetermined time before a current time, within the range, have a time correlation within the range, to compute corrected temperature data, and
displaying, on a display device, a result of the measuring process, including the corrected temperature data,
wherein the range is greater than a minimum heating length indicating a minimum length of the optical fiber with which a peak temperature saturates, and is less than or equal to a side lobe width of the measured temperature data corresponding to a response range for a case in which the minimum heating length is heated.

9. The temperature measuring method as claimed in claim 8, wherein the varying the degree of averaging of the measured temperature data in the time direction, of the correcting, performs a first weighting by judging a temperature change in a case in which the time-sequential difference temperature data have the spatial correlation or the time correlation within the range, and performs a second weighting that is different from the first weighting by judging noise in a case in which the time-sequential difference temperature data have no spatial correlation or no time correlation within the range.

10. The temperature measuring method as claimed in claim 9, wherein
the first weighting judges that the difference temperature data between a currently acquired measured temperature data and a previously acquired measured temperature data is the temperature change, and computes the corrected temperature data including one of the currently acquired measured temperature data, data obtained by weighting the currently acquired measured temperature data, and data obtained by weighting predicted temperature data predicted from the previously acquired measured temperature data and the currently acquired measured temperature data, and
the second weighting judges that the difference temperature data between the currently acquired measured temperature data and the previously acquired measured temperature data is noise, and computes the corrected temperature data including data obtained by weighting the previously acquired measured temperature data.

11. The temperature measuring method as claimed in claim 9, wherein the measuring process further includes
computing, by the processor, a temperature distribution within the range from the measured temperature data, using, as a parameter for distinguishing whether a change in the temperature distribution is the temperature change or the noise, set data selected from a group consisting of a sum-set of the difference temperature data, an average value of the difference temperature data, a sum-set of signs of the difference temperature data, and a distortion of a variance of the difference temperature data.

12. The temperature measuring method as claimed in claim 11, wherein the displaying the result of the measuring process further displays, on the display device, at least one of the temperature distribution, the temperature at each of the plurality of measuring points, and a warning according to the corrected temperature data, on the display device.

13. The temperature measuring method as claimed in claim 11, wherein the measuring process further includes
judging, by the processor, the change within the temperature distribution as being the temperature change when the parameter is greater than a threshold value, and
judging, by the processor, the change within the temperature distribution as being the noise when the parameter is less than or equal to the threshold value.

14. The temperature measuring method as claimed in claim 8, wherein the laser light source is one of a solid state laser and a semiconductor laser.

15. A non-transitory computer-readable recording medium having stored therein a program for causing a computer to execute a temperature measuring process comprising:

measuring a temperature at a plurality of measuring points based on a wavelength component, that is separated by a separator from back-scattering light of optical pulses output from an optical switch and detected by a detector, to acquire measured temperature data, wherein the optical switch alternately switches at predetermined intervals between a first mode in which the optical switch inputs optical pulses from a laser light source to a first end of an optical fiber that is arranged to pass through the plurality of measuring points and outputs the optical pulses output from a second end of the optical fiber opposite to the first end, and a second mode in which the optical switch inputs the optical pulses from the laser light source to the second end of the optical fiber and outputs the optical pulses output from the first end of the optical fiber;

correcting the measured temperature data by varying a degree of averaging of the measured temperature data in a time direction, according to whether a time-sequential difference temperature data corresponding to a difference of the measured temperature data within a range, that uses a position of the optical fiber as a reference and includes sections on both sides of the position, have a spatial correlation within the range, or a time-sequential difference temperature data corresponding to a difference of a current measured temperature data and a past measured temperature data measured within a predetermined time before a current time, within the range, have a time correlation within the range, to compute corrected temperature data, and displaying, on a display device, a result of the temperature measuring process, including the corrected temperature data, wherein the range is greater than a minimum heating length indicating a minimum length of the optical fiber with which a peak temperature saturates, and is less than or equal to a side lobe width of the measured temperature data corresponding to a response range for a case in which the minimum heating length is heated.

16. The non-transitory computer-readable recording medium as claimed in claim 15, wherein the varying the degree of averaging of the measured temperature data in the time direction, of the correcting, performs a first weighting by judging a temperature change in a case in which the time-sequential difference temperature data have the spatial correlation or the time correlation within the range, and performs a second weighting that is different from the first weighting by judging noise in a case in which the time-sequential difference temperature data have no spatial correlation or no time correlation within the range.

17. The non-transitory computer-readable recording medium as claimed in claim 16, wherein
the first weighting judges that the difference temperature data between a currently acquired measured temperature data and a previously acquired measured temperature data is the temperature change, and computes the corrected temperature data including one of the currently acquired measured temperature data, data obtained by weighting the currently acquired measured temperature data, and data obtained by weighting predicted temperature data predicted from the previously acquired measured temperature data and the currently acquired measured temperature data, and
the second weighting judges that the difference temperature data between the currently acquired measured temperature data and the previously acquired measured temperature data is noise, and computes the corrected temperature data including data obtained by weighting the previously acquired measured temperature data.

18. The non-transitory computer-readable recording medium as claimed in claim 16, wherein the temperature measuring process further comprising:
computing a temperature distribution within the range from the measured temperature data, using, as a parameter for distinguishing whether a change in the temperature distribution is the temperature change or the noise, set data selected from a group consisting of a sum-set of the difference temperature data, an average value of the difference temperature data, a sum-set of signs of the difference temperature data, and a distortion of a variance of the difference temperature data.

19. The non-transitory computer-readable recording medium as claimed in claim 18, wherein the temperature measuring process further comprising:
judging the change within the temperature distribution as being the temperature change when the parameter is greater than a threshold value, and
judging the change within the temperature distribution as being the noise when the parameter is less than or equal to the threshold value.

20. The non-transitory computer-readable storage medium as claimed in claim 18, wherein the displaying the result of the temperature measuring process further displays, on the display device, at least one of the temperature distribution, the temperature at each of the plurality of measuring points, and a warning according to the corrected temperature data, on the display device.

* * * * *